Figure 1:
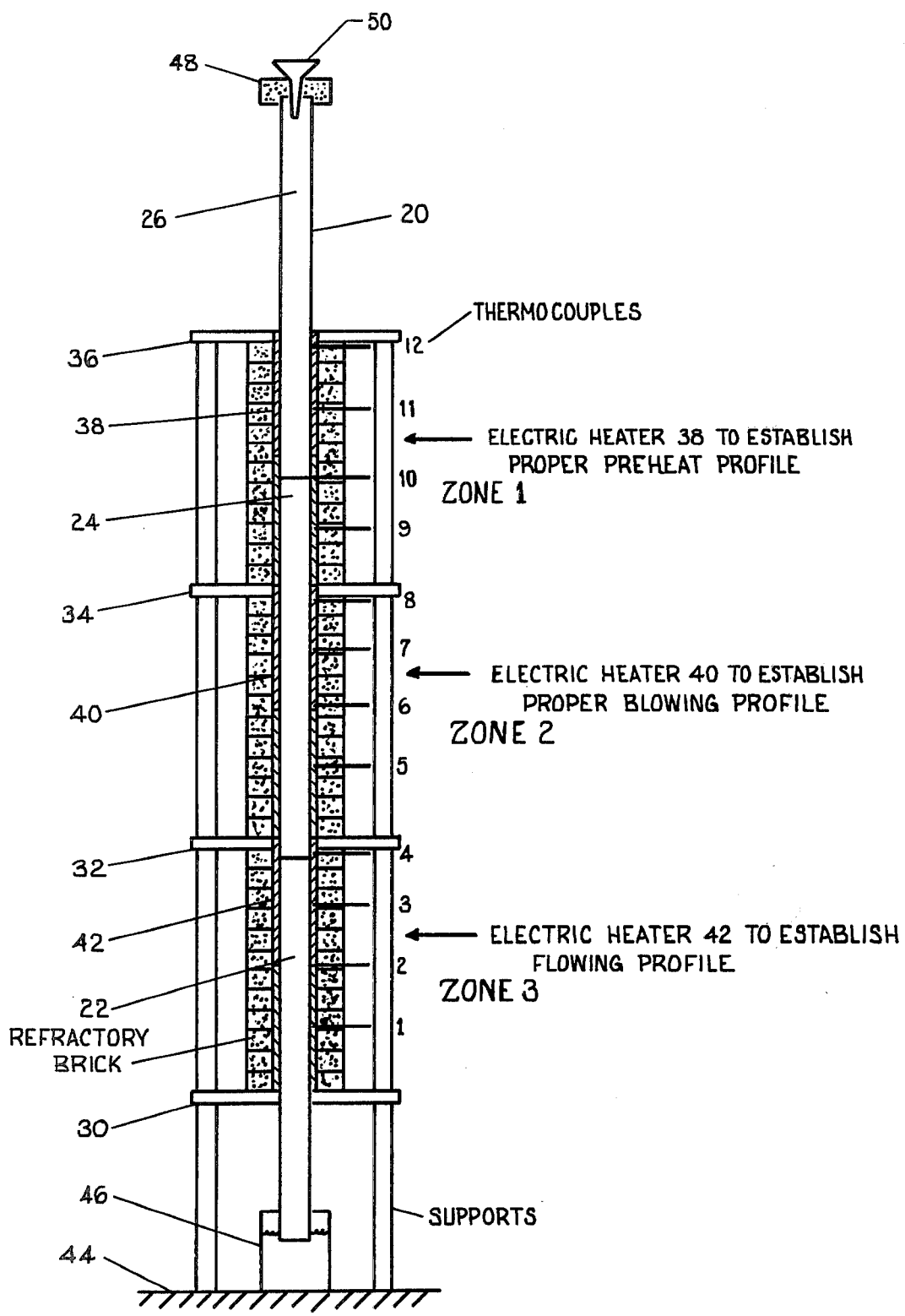

United States Patent [19]
Budrick et al.

[11] 4,017,290
[45] Apr. 12, 1977

[54] METHOD AND APPARATUS FOR MAKING UNIFORM PELLETS FOR FUSION REACTORS

[75] Inventors: Ronald G. Budrick, Ann Arbor, Mich.; Frank T. King, Hillsboro, Oreg.; Alfred J. Martin; Robert L. Nolen, Jr., both of Ann Arbor, Mich.; David E. Solomon, Ann Arbor, Mich.

[73] Assignee: KMS Fusion, Inc., Ann Arbor, Mich.

[22] Filed: Apr. 15, 1974

[21] Appl. No.: 463,860

[52] U.S. Cl. .................................. 65/21; 65/22; 65/141; 65/142; 264/15; 264/43; 264/54; 425/4 C

[51] Int. Cl.² ................. C03B 19/10; C03B 19/08

[58] Field of Search .............. 65/21, 22, 141, 142; 264/43, 51, 54, 15; 425/4 C

[56] References Cited
UNITED STATES PATENTS

| | | | |
|---|---|---|---|
| 2,676,892 | 4/1954 | McLaughlin | 65/142 X |
| 3,171,714 | 3/1965 | Jones et al. | 65/142 X |
| 3,350,213 | 10/1967 | Peyches | 65/21 X |
| 3,365,315 | 1/1968 | Beck et al. | 65/22 X |

*Primary Examiner*—Robert L. Lindsay, Jr.
*Attorney, Agent, or Firm*—Barnes, Kisselle, Raisch & Choate

[57] ABSTRACT

A method and apparatus for making uniform pellets for laser driven fusion reactors which comprises selection of a quantity of glass frit which has been accurately classified as to size within a few micrometers and contains an occluded material, such as urea, which gasifies and expands when heated. The sized particles are introduced into an apparatus which includes a heated vertical tube with temperatures ranging from 800° C to 1300° C. The particles are heated during the drop through the tube to molten condition wherein the occluded material gasifies to form hollow microspheres which stabilize in shape and plunge into a collecting liquid at the bottom of the tube. The apparatus includes the vertical heat resistant tube, heaters for the various zones of the tube and means for introducing the frit and collecting the formed microspheres.

4 Claims, 2 Drawing Figures

METHOD AND APPARATUS FOR MAKING UNIFORM PELLETS FOR FUSION REACTORS

This invention relates to a Method and Apparatus for Making Uniform Pellets for Fusion Reactors and more particularly to a method and apparatus for manufacturing microspheres (hollow glass spheres) of (1) controlled wall thickness and (2) size with a capability of a wide parametric range.

There is much work being done presently to achieve a fusion reaction by exposing a quantity of fusion fuel, as, for example, deuterium or deuterium-tritium to a pulsed laser beam. Patents which disclose this process in a general way are: Whittlesey, U.S. Pat. No. 3,378,446 — 4-16-68; Daiber, U.S. Pat. No. 3,489,645 — 1-13-70; Fraas, U.S. Pat. No. 3,624,239 — 11-30-71; Hedstrom, U.S. Pat. No. 3,762,992 — 10-02-73.

In addition there are a number of pending applications of Keith A. Brueckner which disclose such a process. One such application bears Ser. No. 377,508 and filing date of July 10, 1973.

The above patents disclose the use of a droplet of deuterium or a pellet under cryogenic temperatures so that it can be treated as a solid. These patents contemplate dropping the fuel into a reaction chamber and timing the laser pulse to meet the droplet at about the center of the reaction chamber. Another patent application of Robert J. Teitel and David E. Solomon, Ser. No. 339,558, filed Mar. 9, 1973, discloses a fuel configuration in the form of a hollow, glass microsphere which is filled with fusion fuel, such as deuterium or deuterium-tritium, by utilizing the permeability characteristics of the glass walls of the microsphere and causing the fuel in gaseous form to move through the walls to the interior of the sphere. Once the microspheres are charged, they can be stored for long periods under suitable conditions until used in the fusion process.

While hollow microspheres are available in commercial quantities, the non-uniformity of size and wall thickness makes them undesirable for use in the fusion process.

It is an object of the present invention to provide a method and apparatus for the manufacture of microspheres in a very small diameter, e.g., 100–400 micrometers diameter. It is a further object to provide a system which makes it possible to control the particular size of mircrosphere being made by controlling the input material.

Other objects and features of the invention relating to details of construction of the apparatus and the control of the method will be apparent in the following description and claims in which the principles of operation are set forth together with the best mode presently contemplated for the practice of the invention.

Figure 2:
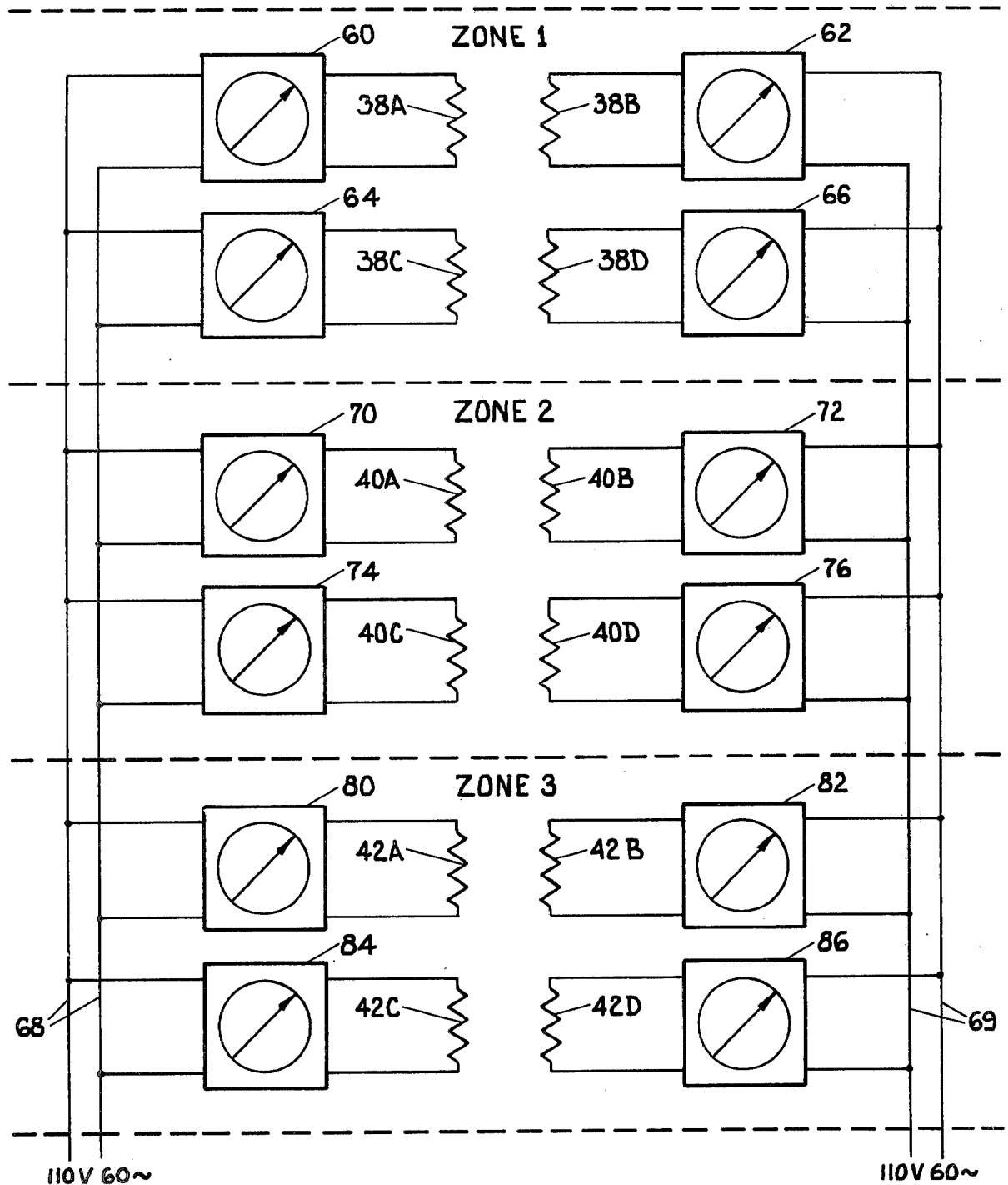

Drawings accompany the disclosure and the various views thereof may be briefly described as:

FIG. 1 - a vertical section of the apparatus used in the production of the microspheres, FIG. 2 - a diagrammatic circuit display illustrating the heating system.

Desirable microsphere specifications are as follows:

TABLE I

Ability to Withstand Thermal Cycle: 4°K – 600°K
Shear strength: > 100,000 psi
Tensile strength: > 1,000,000 psi
Resistance to abrasion: high
Permeability to hydrogen at 600°K: $10^{-8}$

TABLE I-continued

Permeability to hydrogen at 300°K: $10^{-13}$
Permeability to hydrogen at 77°K: $10^{-17}$
Reflectivity from 10 to 50 microns: high
Reflectivity at 1.06 microns: low
Absorptivitiy at 1.06 microns: high
Outside diameter: 100 – 400 $\mu$m ± 1 $\mu$m
Wall thickness: 1 – 4% ± .4 $\mu$m of diameter
Wall uniformity: ± 2% of the wall
Concentricity of ID and OD: ± 1% of OD
Sphericity: ± 1%
Surface finish: < 2 $\mu$m rms
Specific gravity: < 0.3
Chemical composition:
~ 70% $SiO_2$
~ 25% $Na_2O$
~ 0% $Pb_xO_y$
~ 0% $Bi_xO_y$
~ 5% CaO The manufacture of glass microspheres is presently done on a commercial scale but the quality is, as above mentioned, not satisfactory for the exacting demands of the fusion process. One important factor in the manufacture of microspheres is the quality and size of the glass particles which are spheriodized (blown) into the hollow bodies needed for use as fusion fuel containers. Reference is made to a copending application of R. G. Budrick, F. T. King, R. L. Nolen, and D. E. Solomon, Ser. No. 463,861, filed Apr. 5, 1974, which describes a process for making glass frit for use in the manufacture of microspheres.

With reference to FIG. 1 of the drawing in the present application, there is illustrated a vertical drop furnace in which the microspheres are made. The main element of the drop furnace is a central straight refractory tube 20 formed of three aligned sections 22, 24, and 26. These sections can be about 36 inches in length and about 3 inches in outside diameter. The inside diameter is 2¾ inches. The tube sections are refractory in nature to withstand high temperatures. One suitable material is Mullite as furnished by McDanel Refactory Co. The composite tube is supported by apertured panels 30, 32, 34, and 36 formed af a heat resistant material such as Transite (22 inches × 22 inches × 1 inches) spaced along the length. Refractory bricks 9 inches × 2 inches × 4 inches are stacked around the tube between the panels and spaced radially a short distance from the tube.

It is necessary to heat the tube 22 throughout its length and this is accomplished by three separate and independently controlled heating units formed by enclosing the tube in wrap-around heaters. The first heater unit 38 formed of hemi-cylinders 3 inches fitted around the tube 20, with suitable lead wires (not shown), is positioned as a completed cylinder between panels 36 and 34. The second heater unit 40 is located between the panels 34 and 32, and the third heater unit 42 between panels 30 and 32. Suitable thermocouples 1 to 12 are provided, spaced along the length of the tube between panels 30 and 36 to allow proper observation and control of temperature.

The first zone heater unit 38 between plates 36 and 34 has the function of providing a proper preheat profile. The heaters are rated at 8 amperes, 130 volts and a total of 6 complete cylinders (12 half sections) are required. The second zone heater 40 plates 34 and 32 establishes a proper blowing profile. The third zone heater 42 between plates 32 and 30 permits flowing of the molten glass.

The entire assembly is supported from a floor base 44 so that the bottom of the tube section 22 is spaced from the base shelf (44), about 3 inches or 4 inches. In operation a container 46 filled with a fluid such as water is positioned below tube section 22 so that the liquid level is above the bottom of the tube to close it from surrounding atmosphere. At the top of the tube is an insulating block 48, apertured to receive a funnel 50. This assists in the introduction of the frit into the center of the tube and also closes off the top of the tube. This together with the liquid trap at the bottom minimizes the chimney effect (updraft) in the heated tube. A strong updraft tends to drive the falling frit against the walls of the tube and destroys the intended function.

The refractory tube as described smoothes the overall temperature profile and is self-cleaning. The sectioned construction permits easy replacement in the event of cracking or breakage.

In the operation of the system, glass frit of a chosen size, perhaps in a range of 50 to 90 micrometers, is introduced into the heated tube 20 through the funnel 50. This is preferably accomplished by depositing a quantity of frit in a small glass or metal trough and vibrating the trough to introduce the frit steadily without agglomeration. The tube is preferably heated to temperatures ranging from 900° to 1100° C in zone 1, 1100° to 1300° C in zone 2, and 800° to 1000° C in zone 3. The frit is heated to a molten condition and the occluded material, for example, urea, expands to create the hollow sphere. The molten hollow sphere stabilizes in shape as it completes its fall before it plunges into the liquid in beaker 46. Broken spheres fall to the bottom of the liquid while the complete spheres float on the top of the liquid.

After a batch of a particular predetermined frit size is run through the tube, the collector 46 is removed and the floating spheres may be immediately removed to a glass specimen plate on which they can be examined under microscope for quality and size. A second batch can be run immediately using a different frit size without altering the temperature profile in the drop tube and a second and different microsphere size can be obtained. Thus the process can be repeated as often as desired during a particular temperature profile of the tube.

Established analytical procedures make it possible to determine outer diameter, wall thickness, wall uniformity, and other information on each sphere. The spheres may then be charged with a desired fusion fuel and mounted and stored for use in the fusion reactor chamber.

FIG. 2 of the drawings illustrates an electrical circuit diagram which is utilized in the heating of the composite tube 22, 24, 26. There are three zones each of which has four resistance heaters, one for each semi-circular wrap around heater units. Zone 1 has resistance heaters 38 A, B, C, and D each controlled by a separate rheostats 60, 62, 64, and 66. Suitable supply lines 68 and 69, respectively, are provided as the electrical energy source. Zone 2 has resistance heaters 40 A, B, C, and D and control rheostats 70, 72, 74, and 76. Zone 3 has resistance heaters 42 A, B, C, and D controlled by rheostats 80, 82, 84, and 86.

Thus the temperature in the various zones can be closely controlled the indicated temperature to achieve the desired results.

What we claim is:

1. A method of forming sized microspheres which comprises:
   a. separating glass frit into a plurality of quantities of predetermined selected sizes in the range of 50 to 90 micrometers,
   b. heating a vertical drop tube from outside the tube to temperature ranges between 800° and 1300° C,
   c. closing the top of the tube with a closure and the bottom of said tube with a quantity of receiving liquid to prevent down or updraft,
   d. feeding a quantity of a selected size of frit into the top of said heated tube and recovering said frit as microspheres in said liquid, and
   e. repeating said feeding step with a different selected size in each instance to provide a plurality of microspheres of differing sizes.

2. A method of forming sized microspheres which comprises:
   a. separating glass frit into a plurality of quantities of predetermined selected sizes in the range of 50 to 90 micrometers,
   b. heating a vertical drop tube from outside the tube into a series of three temperature ranges from top to bottom, including a first range of 900° to 100° C, a second range from 1100° to 1300° C, and a third range from 800 to 1000° C,
   c. closing the top of the tube with a closure and the bottom of said tube with a quantity of receiving liquid to prevent down or updraft,
   d. feeding a quantity of a selected size of frit into the top of said heated tube and recovering said frit as microspheres in said liquid, and
   e. repeating said feeding step with a different selected size in each instance to provide a plurality of microspheres of differing sizes.

3. An apparatus for forming glass microspheres in relatively large quantities which comprises:
   a. a vertical refractory tube formed of aligned sections,
   b. means to support said tube in vertical position,
   c. means comprising electrical heating elements surrounding said tube to heat said tube from the outside to temperatures ranging from 800° to 1000° C,
   d. means to close said tube at the top end,
   e. means including a liquid body and retainer therefor for closing the bottom end of the tube, and
   f. means adjacent the top of the tube to feed a quantity of glass frit at a point where it will fall through the heated zone.

4. An apparatus as defined in claim 3 in which said heating elements surrounding said tube are divided into three zone sections, and means to control the heating of said zones to provide a preheat section near the top with a temperature of 900° to 1100° C, an intermediate expansion section with a temperature in the range of 1100° to 1300° C, and a shape stabilizing section near the bottom heated to a range of 800° to 1000° C.

* * * * *

UNITED STATES PATENT OFFICE
CERTIFICATE OF CORRECTION

PATENT NO. : 4,017,290
DATED : April 12, 1977
INVENTOR(S) : Ronald G. Budrick et al It is certified that error appears in the above-identified patent and that said Letters Patent are hereby corrected as shown below:

Col. 4, line 28, change "100°C." to "1100°C."

Signed and Sealed this fifth Day of July 1977

[SEAL]

Attest:

RUTH C. MASON
Attesting Officer

C. MARSHALL DANN
Commissioner of Patents and Trademarks

UNITED STATES PATENT AND TRADEMARK OFFICE
Certificate

Patent No. 4,017,290  Patented April 12, 1977

Ronald G. Budrick, Frank T. King, Alfred J. Martin, Robert L. Nolen and David E. Solomon Application having been made by Ronald G. Budrick, Frank T. King, Alfred J. Martin, Robert L. Nolen and David E. Solomon, the inventors named in the patent above identified, for the issuance of a certificate under the provisions of Title 35, Section 256, of the United States Code, adding the name of Richard G. Snell as a joint inventor, and a showing and proof of facts satisfying the requirements of the said section having been submitted, it is this 22nd day of May, 1984, certified that the name of the said Richard G. Snell is hereby added to the said patent as a joint inventor with the said Ronald G. Budrick, Frank T. King, Alfred J. Martin, Robert L. Nolen and David E. Solomon.

Fred W. Sherling,
*Associate Solicitor.*